United States Patent
Sato (10) Patent No.: US 10,035,501 B2
(45) Date of Patent: Jul. 31, 2018

(54) HYBRID CAR

(71) Applicant: TOYOTA JIDOSHA KABUSHIKI KAISHA, Toyota-shi, Aichi-ken (JP)

(72) Inventor: Keita Sato, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 60 days.

(21) Appl. No.: 15/200,029

(22) Filed: Jul. 1, 2016

(65) Prior Publication Data

US 2017/0008508 A1 Jan. 12, 2017

(30) Foreign Application Priority Data

Jul. 6, 2015 (JP) ................................. 2015-135482

(51) Int. Cl.
| | |
|---|---|
| *B60W 10/08* | (2006.01) |
| *B60W 20/40* | (2016.01) |
| *B60W 10/06* | (2006.01) |
| *B60K 6/365* | (2007.10) |

(52) U.S. Cl.
CPC .......... *B60W 10/08* (2013.01); *B60W 10/06* (2013.01); *B60W 20/40* (2013.01); *B60W 2520/10* (2013.01); *B60W 2540/10* (2013.01); *B60W 2710/0666* (2013.01); *B60W 2710/083* (2013.01); *B60Y 2200/92* (2013.01); *B60Y 2300/188* (2013.01); *B60Y 2300/1884* (2013.01); *Y02T 10/6291* (2013.01); *Y10S 903/93* (2013.01); *Y10S 903/951* (2013.01)

(58) Field of Classification Search
CPC ....... B60W 10/08; B60W 10/06; B60W 20/40
See application file for complete search history.

(56) References Cited

U.S. PATENT DOCUMENTS

| | | | |
|---|---|---|---|
| 2013/0166125 A1* | 6/2013 | Yamamoto | ................ B60L 7/14 701/22 |
| 2014/0350764 A1* | 11/2014 | Arai | ...................... B60W 40/10 701/22 |
| 2014/0371963 A1 | 12/2014 | Yamamoto | |
| 2016/0107635 A1* | 4/2016 | Kodawara | ................ B60K 6/48 701/22 |

FOREIGN PATENT DOCUMENTS

| | | |
|---|---|---|
| CN | 104024071 A | 9/2014 |
| JP | 2011-57116 | 3/2011 |
| JP | 2013-119349 A | 6/2013 |
| WO | WO2013/088509 A1 | 6/2013 |

* cited by examiner

*Primary Examiner* — Dale Moyer
(74) *Attorney, Agent, or Firm* — Finnegan, Henderson, Farabow, Garrett & Dunner, LLP (57) ABSTRACT

At a time of HV traveling entailing a load operation of an engine in a CD mode, an electronic control unit sets a required torque Tr* by using a map for a CS mode, in which the required torque Tr* is set to be lower than in a map for the CD mode, as at a time of the CS mode. Then, the electronic control unit control the engine and a motor for traveling in accordance with the required torque Tr*. Accordingly, a rise in the required torque Tr* can be suppressed compared to setting of the required torque Tr* using the map for the CD mode and a sense of high-rpm idling attributable to a rise in a rotation speed of the engine can be inhibited from being felt by a driver.

6 Claims, 7 Drawing Sheets

*FIG. 5A*
EV TRAVELING, HV TRAVELING
(AUTONOMOUS OPERATION)

*FIG. 5B*
HV TRAVELING
(LOAD OPERATION)

HYBRID CAR

INCORPORATION BY REFERENCE

The disclosure of Japanese Patent Application No. 2015-135482 filed on Jul. 6, 2015 including the specification, drawings and abstract is incorporated herein by reference in its entirety.

BACKGROUND

1. Technical Field

The present disclosure relates to a hybrid car and, more particularly, to a hybrid car that is provided with an engine, a motor, and a battery.

2. Description of Related Art

In the related art, a hybrid car that is configured to be provided with an engine and a motor generator for traveling and an electric power storage device which exchanges electric power with the motor generator and controls the engine and the motor generator for traveling in a charge depleting (CD) mode or a charge sustaining (CS) mode is known as this type of hybrid car (for example, refer to Japanese Patent Application Publication No. 2011-57116 (JP 2011-57116 A)). This hybrid car travels in the CD mode in a case where the electric power storage device has a remaining capacity exceeding a predetermined amount after the traveling is initiated. The hybrid car travels with the CD mode switched to the CS mode once the remaining capacity of the electric power storage device reaches the predetermined amount.

SUMMARY

In this hybrid car, the engine and the motor generator are controlled for traveling in accordance with a required output for traveling in the CD mode or the CS mode. At this time, it is conceivable to allow the required output at a time of the CD mode to exceed the required output at a time of the CS mode. This is based on that the CD mode is a traveling mode in which electric traveling is given more priority over hybrid traveling than in the CS mode, the hybrid traveling being traveling entailing an engine operation and the electric traveling being traveling not entailing the engine operation, and that a driver is less likely to feel a sense of acceleration at a time of acceleration during the electric traveling because a rotation speed of the engine does not rise at the time of the acceleration during the electric traveling. In a case where the required output is set as described above, the required output relatively increases to a significant extent in the event of a transition from a state of the hybrid traveling in the CS mode to a state of the hybrid traveling in the CD mode. As a result, an engine output relatively increases to a significant extent and a sense of high-rpm idling attributable to a rise in the engine rotation speed is felt by the driver in some cases.

A main object of the hybrid car according to the present disclosure is to inhibit a sense of high-rpm idling of an engine from being felt by a driver.

The hybrid car according to the present disclosure adopts the following means in order to achieve the main object described above.

A hybrid car according to a first aspect of the present disclosure includes an engine (22) configured to output power for traveling, a motor (MG2) configured to output power for traveling, a battery (50) configured to exchange electric power with the motor, and an electronic control unit (24, 40, 70) configured to i) control the engine (22) and the motor (MG2) for traveling in accordance with a required output for traveling with respect to an accelerator operation amount in a charge depleting mode or a charge sustaining mode, ii) set the required output such that the required output at a time of the charge depleting mode exceeds the required output at a time of the charge sustaining mode with respect to the same accelerator operation amount at a time of electric traveling as traveling not entailing an operation of the engine (22), and iii) set the required output such that the required output at the time of the charge depleting mode is equal to or higher than the required output at the time of the charge sustaining mode with respect to the same accelerator operation amount and a difference between the required output at the time of the charge depleting mode and the required output at the time of the charge sustaining mode with respect to the same accelerator operation amount is smaller than at the time of the electric traveling at a time of hybrid traveling as traveling entailing the operation of the engine (22).

In the hybrid car according to the first aspect of the present disclosure, the electronic control unit controls the engine and the motor for the traveling in accordance with the required output for traveling with respect to the accelerator operation amount in the charge depleting (CD) mode or the charge sustaining (CS) mode. In addition, the electronic control unit sets the required output such that the required output at the time of the charge depleting mode exceeds the required output at the time of the charge sustaining mode with respect to the same accelerator operation amount at the time of the electric traveling as the traveling not entailing the operation of the engine. Furthermore, the electronic control unit sets the required output such that the required output at the time of the charge depleting mode is equal to or higher than the required output at the time of the charge sustaining mode with respect to the same accelerator operation amount and the difference between the required output at the time of the charge depleting mode and the required output at the time of the charge sustaining mode with respect to the same accelerator operation amount is smaller than at the time of the electric traveling at the time of the hybrid traveling as the traveling entailing the operation of the engine. Accordingly, a rise in the required output at a time of a transition from a state of the hybrid traveling in the CS mode to a state of the hybrid traveling in the CD mode can be suppressed compared to setting of the required output in such a manner that the difference between that at the time of the CD mode and that at the time of the CS mode with respect to the same accelerator operation amount has a uniform value which is high to some extent regardless of whether a traveling mode is the hybrid traveling or the electric traveling. As a result, a rise in an engine output (rotation speed, torque) during this transition can be suppressed and a sense of high-rpm idling of the engine can be inhibited from being felt by a driver. The CD mode is a traveling mode in which the electric traveling is given more priority over the hybrid traveling than in the CS mode. In addition, a target output of the engine (engine output target value) is set to be higher when the required output is high than when the required output is low.

In the hybrid car according to the first aspect of the present disclosure, the electronic control unit (24, 40, 70) may set the required output such that the required output at a time of the hybrid traveling falls short of the required output at the time of the electric traveling with respect to the same accelerator operation amount at the time of the charge depleting mode. In this manner, the required output at the time of the hybrid traveling in the CD mode can be reduced compared to setting of the same required output as at the time of the electric traveling at the time of the hybrid traveling in the CD mode. As a result, the output of the engine (rotation speed, torque) at the time of the hybrid traveling in the CD mode can be reduced, and the sense of the high-rpm idling of the engine can be inhibited from being felt by the driver.

In the hybrid car according to the first aspect of the present disclosure, the electronic control unit (24, 40, 70) may set the required output such that the required output at a time of the hybrid traveling entailing an autonomous operation of the engine (22) is equal to or lower than the required output at the time of the electric traveling and exceeds the required output at a time of the hybrid traveling entailing a load operation of the engine (22) with respect to the same accelerator operation amount at the time of the charge depleting mode. In this manner, a sense of acceleration during acceleration can be enhanced compared to setting of the same required output as at the time of the hybrid traveling entailing the load operation of the engine at the time of the hybrid traveling entailing the autonomous operation of the engine in the CD mode. At the time of the hybrid traveling entailing the autonomous operation of the engine in the CD mode, the possibility of the sense of the high-rpm idling of the engine being felt is sufficiently lower than at the time of the hybrid traveling entailing the load operation of the engine in the CD mode.

In the hybrid car according to the first aspect of the present disclosure, the electronic control unit (24, 40, 70) may set the required output such that the required output at the time of the charge depleting mode and the required output at the time of the charge sustaining mode are equal to each other with respect to the same accelerator operation amount at the time of the hybrid traveling. In this manner, the rise in the required output at the time of the transition from the state of the hybrid traveling in the CS mode to the state of the hybrid traveling in the CD mode can be further suppressed.

A hybrid car according to a second aspect of the present disclosure includes an engine (22) configured to output power for traveling, a motor (MG2) configured to output power for traveling, a battery (50) configured to exchange electric power with the motor, and an electronic control unit (24, 40, 70B) configured to i) control the engine (22) and the motor (MG2) for traveling in accordance with a required output for traveling with respect to an accelerator operation amount in a charge depleting mode or a charge sustaining mode, ii) set the required output such that the required output at a time of the charge depleting mode exceeds the required output at a time of the charge sustaining mode with respect to the same accelerator operation amount, and iii) maintain the charge sustaining mode at the time of the charge sustaining mode and at a time of hybrid traveling when a transition to the charge depleting mode has been requested.

In the hybrid car according to the second aspect of the present disclosure, the electronic control unit controls the engine and the motor for the traveling in accordance with the required output for traveling with respect to the accelerator operation amount in the charge depleting (CD) mode or the charge sustaining (CS) mode. In addition, the electronic control unit sets the required output such that the required output at the time of the charge depleting mode exceeds the required output at the time of the charge sustaining mode with respect to the same accelerator operation amount. Furthermore, the electronic control unit maintains the charge sustaining mode at a time of hybrid traveling when a transition to the charge depleting mode has been requested during the charge sustaining mode. In this manner, a rise in the required output can be suppressed compared to a transition to the CD mode. As a result, the rise in the engine output (rotation speed, torque) can be suppressed compared to this transition being performed and the sense of high-rpm idling of the engine can be inhibited from being felt by the driver. The CD mode is a traveling mode in which the electric traveling is given more priority over the hybrid traveling than in the CS mode. In addition, the target output of the engine (engine output target value) is set to be higher when the required output is high than when the required output is low.

In the hybrid car according to the second aspect of the present disclosure, the electronic control unit (24, 40, 70B) may make the transition to the charge depleting mode during electric traveling and the hybrid traveling entailing an autonomous operation of the engine (22) and maintain the charge sustaining mode during the hybrid traveling entailing a load operation of the engine (22), when the transition to the charge depleting mode has been requested in the charge sustaining mode. This is because, at the time of the electric traveling or the hybrid traveling entailing the autonomous operation of the engine in the CS mode, the possibility of the sense of the high-rpm idling of the engine being felt at the time of the transition to the CD mode is sufficiently lower than at the time of the hybrid traveling entailing the lead operation of the engine in the CS mode.

In the hybrid car according to the second aspect of the present disclosure, the electronic control unit (24, 40, 70B) may be means for making the transition to the charge sustaining mode when an initiation of the load operation of the engine (22) is predicted during the electric traveling or the hybrid traveling entailing the autonomous operation of the engine (22) in the charge depleting mode. In this manner, the required output can be reduced compared to a non-transition to the CS mode (hybrid traveling entailing the load operation of the engine in the CD mode is performed). As a result, the engine output (rotation speed, torque) can be reduced compared to this transition not being performed, and the sense of the high-rpm idling of the engine can be inhibited from being felt by the driver.

The hybrid car according to the first or second aspect of the present disclosure may also be provided with a generator that is capable of exchanging electric power with the battery and a planetary gear that has three rotating elements connected to a drive shaft which is connected to an axle, an output shaft of the engine, and a rotary shaft of the generator.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described by the use of examples.

Figure 1:
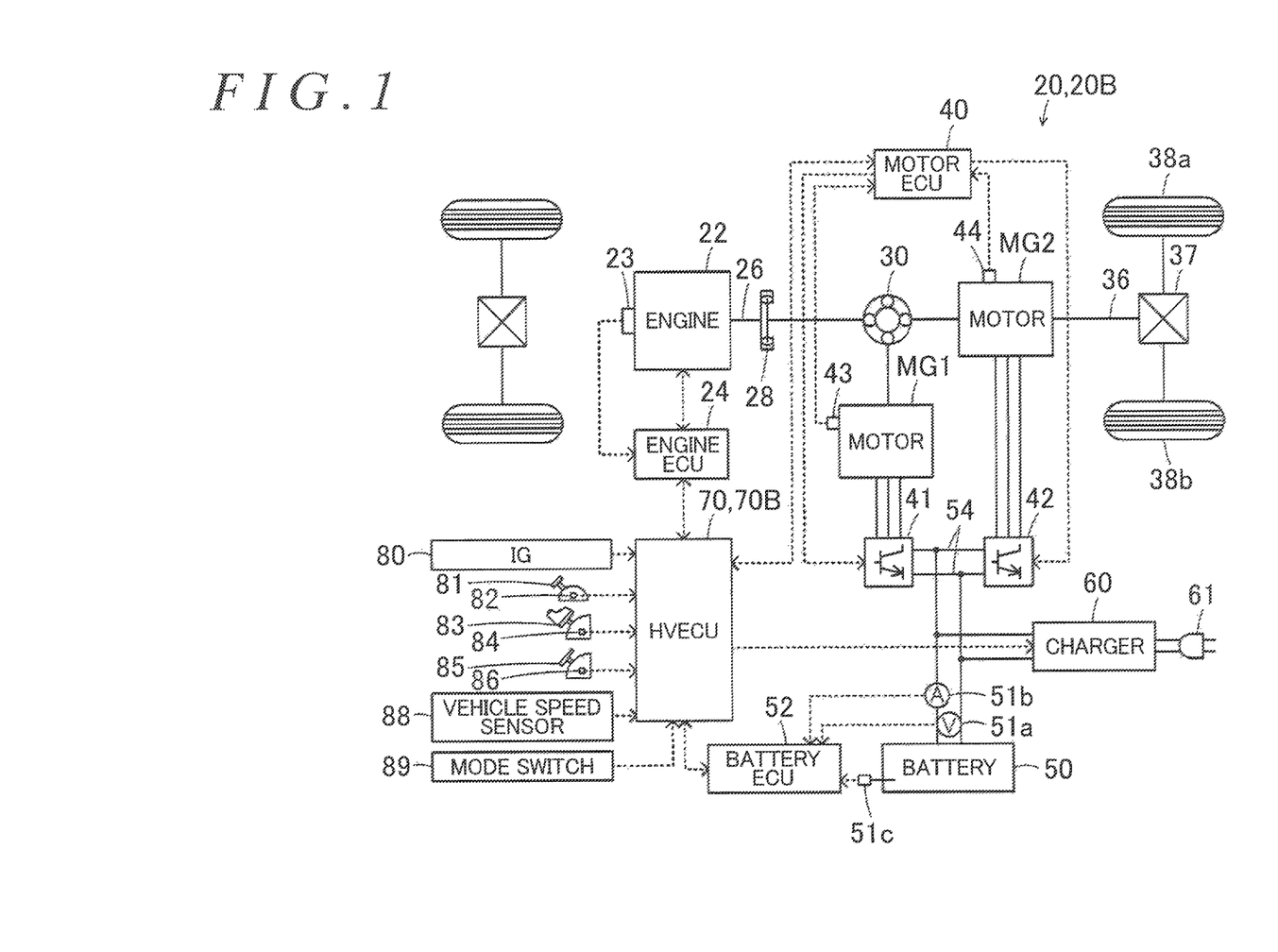
FIG. 1 is a configuration diagram schematically illustrating a configuration of a hybrid car 20 as a first example of the present disclosure.

FIG. 1 is a configuration diagram schematically illustrating a configuration of a hybrid car 20 as a first example of the present disclosure. As illustrated in the drawing, the hybrid car 20 according to the first example is provided with an engine 22, a planetary gear 30, motors MG1, MG2, inverters 41, 42, a battery 50, a charger 60, and an electronic control unit for hybrid (hereinafter, referred to as a "HVECU") 70.

The engine 22 is configured as an internal combustion engine that outputs power by using gasoline, diesel oil, or the like as a fuel. An operation of this engine 22 is controlled by an electronic control unit for the engine (hereinafter, referred to as an "engine ECU") 24.

The engine ECU 24 is configured as a microprocessor that has a CPU (not illustrated) as its main component. The engine ECU 24 is provided with not only the CPU but also a ROM that stores a processing program, a RAM that temporarily stores data, input and output ports, and a communication port. Signals from various sensors that are required for the operation of the engine 22 to be controlled are input to the engine ECU 24 from the input port. Examples of the signals that are input to the engine ECU 24 can include the followings. A crank angle θcr from a crank position sensor 23 that detects a rotational position of a crankshaft 26 of the engine 22. A throttle opening degree TH from a throttle valve position sensor that detects a position of a throttle valve.

Various control signals for the operation of the engine 22 to be controlled are output from the engine ECU 24 via the output port. Examples of the control signals that are output from the engine ECU 24 can include the followings. A control signal to a throttle motor that regulates the position of the throttle valve. A control signal to a fuel injection valve. A control signal to an ignition coil that is integrated with an igniter.

The engine ECU 24 is connected to the HVECU 70 via the communication port. The engine ECU 24 controls the operation of the engine 22 based on a control signal from the HVECU 70 and, if necessary, outputs data relating to an operation state of the engine 22 to the HVECU 70. The engine ECU 24 calculates a rotation speed of the crankshaft 26, that is, a rotation speed Ne of the engine 22, based on the crank angle θcr from the crank position sensor 23.

The planetary gear 30 is configured as a single pinion-type planetary gear mechanism. A rotor of the motor MG1 is connected to a sun gear of the planetary gear 30. A drive shaft 36, which is connected to drive wheels 38a, 38b via a differential gear 37, is connected to a ring gear of the planetary gear 30. The crankshaft 26 of the engine 22 is connected to a carrier of the planetary gear 30 via a damper 28.

The motor MG1 is configured as, for example, a synchronous generator motor. As described above, the rotor of the motor MG1 is connected to the sun gear of the planetary gear 30. The motor MG2 is configured as, for example, a synchronous generator motor. A rotor of the motor MG2 is connected to the drive shaft 36. The inverters 41, 42 are connected to the battery 50 via an electric power line 54. The motors MG1, MG2 are driven to rotate by a plurality of switching elements (not illustrated) of the inverters 41, 42 being subjected to a switching control by an electronic control unit for the motors (hereinafter, referred to as a "motor ECU") 40.

The motor ECU 40 is configured as a microprocessor that has a CPU (not illustrated) as its main component. The motor ECU 40 is provided with not only the CPU but also a ROM that stores a processing program, a RAM that temporarily stores data, input and output ports, and a communication port. Signals from various sensors that are required for the driving of the motors MG1, MG2 to be controlled are input to the motor ECU 40 via the input port. Examples of the signals that are input to the motor ECU 40 can include the followings. Rotational positions θm1, θm2 from rotational position detection sensors 43, 44 that detect rotational positions of the rotors of the motors MG1, MG2. A phase current from a current sensor that detects a current flowing in each phase of the motors MG1, MG2.

Switching control signals or the like are output from the motor ECU 40 to the plurality of switching elements (not illustrated) of the inverters 41, 42 via the output port. The motor ECU 40 is connected to the HVECU 70 via the communication port. The motor ECU 40 controls the driving of the motors MG1, MG2 based on a control signal from the HVECU 70 and, if necessary, outputs data relating to driving states of the motors MG1, MG2 to the HVECU 70. The motor ECU 40 calculates rotation speeds Nm1, Nm2 of the motors MG1, MG2 based on the rotational positions θm1, θm2 of the rotors of the motors MG1, MG2 from the rotational position detection sensors 43, 44.

The battery 50 is configured as, for example, a lithium-ion secondary battery or a nickel-hydrogen secondary battery. As described above, this battery 50 is connected to the inverters 41, 42 via the electric power line 54. The battery 50 is managed by an electronic control unit for the battery (hereinafter, referred to as a "battery ECU") 52.

The battery ECU 52 is configured as a microprocessor that has a CPU (not illustrated) as its main component. The battery ECU 52 is provided with not only the CPU but also a ROM that stores a processing program, a RAM that temporarily stores data, input and output ports, and a communication port. Signals from various sensors that are required for the management of the battery 50 are input to the battery ECU 52 via the input port. Examples of the signals that are input to the battery ECU 52 can include the followings. A battery voltage Vb from a voltage sensor 51a that is installed between terminals of the battery 50. A battery current Ib from a current sensor 51b that is attached to an output terminal of the battery 50. A battery temperature Tb from a temperature sensor 51c that is attached to the battery 50.

The battery ECU 52 is connected to the HVECU 70 via the communication port. If necessary, the battery ECU 52 outputs data relating to a state of the battery 50 to the HVECU 70. The battery ECU 52 calculates an electric power storage ratio SOC based on an integrated value of the battery current Ib from the current sensor 51b. The electric power storage ratio SOC is a ratio of a capacity of electric power that can be discharged from the battery 50 to a full capacity of the battery 50. In addition, the battery ECU 52 calculates input and output limits Win, Wout based on the calculated electric power storage ratio SOC and the battery temperature Tb from the temperature sensor 51c.

The charger 60 is connected to the electric power line 54. The charger 60 is configured to be capable of charging the battery 50 with electric power from an external electric power source when an electric power source plug 61 is connected to the external electric power source such as a household electric power source. This charger 60 is provided with an AC/DC converter and a DC/DC converter. The AC/DC converter converts AC electric power from the external electric power source that is supplied via the electric power source plug 61 to DC electric power. The DC/DC converter converts a voltage of the DC electric power from the AC/DC converter and supplies it to the battery 50 side. This charger 60 supplies the battery 50 with the electric power from the external electric power source by the AC/DC converter and the DC/DC converter being controlled by the HVECU 70 when the electric power source plug 61 is connected to the external electric power source.

The HVECU 70 is configured as a microprocessor that has a CPU (not illustrated) as its main component. The HVECU 70 is provided with not only the CPU but also a ROM that stores a processing program, a RAM that temporarily stores data, input and output ports, and a communication port. Signals from various sensors are input to the HVECU 70 via the input port. Examples of the signals that are input to the HVECU 70 can include the followings. An ignition signal from an ignition switch 80. A shift position SP from a shift position sensor 82 that detects an operation position of a shift lever 81. An accelerator opening degree Acc from an accelerator pedal position sensor 84 that detects a depression amount of an accelerator pedal 83. A brake pedal position BP from a brake pedal position sensor 86 that detects a depression amount of a brake pedal 85. A vehicle speed V from a vehicle speed sensor 88. A mode instruction signal Smd from a mode switch 89 for an instruction on a charge sustaining (CS) mode or a charge depleting (CD) mode in which electric traveling (EV traveling) is given more priority than in the CS mode out of hybrid traveling (HV traveling) for traveling entailing the operation of the engine 22 and the EV traveling for traveling not entailing the operation of the engine 22.

A control signal or the like is output from the HVECU 70 to the charger 60 via the output port. As described above, the HVECU 70 is connected to the engine ECU 24, the motor ECU 40, and the battery ECU 52 via the communication ports, and exchanges various controls signals and data with the engine ECU 24, the motor ECU 40, and the battery ECU 52.

In the hybrid car 20 according to the first example that has the configuration described above, the HV traveling or the EV traveling is performed in the CD mode or the CS mode.

At a time of the HV traveling entailing a load operation of the engine 22 in the CD mode or the CS mode, the HVECU 70 sets a required torque Tr* required for the traveling first. A method for setting the required torque Tr* will be described later. Then, the HVECU 70 calculates a power Pr* for the traveling required for the traveling by multiplying the required torque Tr* by a rotation speed Nr of the drive shaft 36. The rotation speed Nm2 of the motor MG2, a rotation speed that is obtained by the vehicle speed V being multiplied by a conversion factor, or the like can be used as the rotation speed Nr of the drive shaft 36. Subsequently, the HVECU 70 calculates a required power Pe* that is required for a vehicle by subtracting a charging and discharging power demand Pb* of the battery 50 (positive value at a time of the discharging of the battery 50) from the power for the traveling. At a time of the CS mode, the charging and discharging power demand Pb* is set to value 0 when the electric power storage ratio SOC of the battery 50 is a target ratio SOC* (such as a predetermined value and the electric power storage ratio SOC at a time of switching from the CD mode), is set to a negative value (value for charging) when the electric power storage ratio SOC is lower than the target ratio SOC*, and is set to a positive value (value for discharging) when the electric power storage ratio SOC is higher than the target ratio SOC*. At a time of the CD mode, the charging and discharging power demand Pb* is set to value 0 regardless of the electric power storage ratio SOC. Then, the HVECU 70 sets a target rotation speed Ne* and a target torque Te* of the engine 22 by using the required power Pe* and an operation line for an efficient operation of the engine 22. These target rotation speed Ne* and target torque Te* as a whole are higher when the required power Pe* is large than when the required power Pe* is small. Subsequently, the HVECU 70 sets, within a range of the input and output limits Win. Wout of the battery 50, a torque command Tm1* of the motor MG1 by a rotation speed feedback control for causing the rotation speed Ne of the engine 22 to become the target rotation speed Ne* and a torque command Tm2* of the motor MG2 such that the required torque Tr* is output to the drive shaft 36. Then, the HVECU 70 transmits the target rotation speed Ne* and the target torque Te* of the engine 22 to the engine ECU 24 and transmits the torque commands Tm1*, Tm2* of the motors MG1, MG2 to the motor ECU 40. After receiving the target rotation speed Ne* and the target torque Te* of the engine 22, the engine ECU 24 performs a suctioned air amount control, a fuel injection control, an ignition control, and the like on the engine 22 such that the engine 22 is operated based on the received target rotation speed Ne* and target torque Te*. After receiving the torque commands Tm1*, Tm2* of the motors MG1, MG2, the motor ECU 40 performs the switching control on the plurality of switching elements of the inverters 41, 42 such that the motors MG1, MG2 are driven in compliance with the torque commands Tm1*, Tm2*.

At a time of the HV traveling entailing an autonomous operation of the engine 22 in the CD mode or the CS mode, the HVECU 70 sets the required torque Tr* first. Then, the HVECU 70 sets value 0 as the torque command Tm1* of the motor MG1, and sets the torque command Tm2* of the motor MG2 such that the required torque Tr* is output to the drive shaft 36 within the range of the input and output limits Win, Wout of the battery 50. Then, the HVECU 70 transmits an autonomous operation command for the engine 22 to the engine ECU 24 and transmits the torque commands Tm1*, Tm2* of the motors MG1, MG2 to the motor ECU 40. After receiving the autonomous operation command for the engine 22, the engine ECU 24 performs the suctioned air amount control, the fuel injection control, the ignition control, and the like on the engine 22 such that the engine 22 is autonomously operated at a predetermined rotation speed Nid (such as 1,000 rpm and 1,200 rpm). After receiving the torque commands Tm1*, Tm2* of the motors MG1, MG2, the motor ECU 40 performs the switching control on the plurality of switching elements of the inverters 41, 42 such that the motors MG1, MG2 are driven in compliance with the torque commands Tm1*, Tm2*.

When a stop condition of the engine 22 is satisfied during the HV traveling in the CD mode or the CS mode, the operation of the engine 22 is stopped and the hybrid car 20 is subjected to a transition to the traveling. Examples of the stop condition of the engine 22 can include the following (1) to (13). In the first example, it is determined that the stop condition of the engine 22 is satisfied when all of the following conditions are satisfied. In the first example, the engine 22 is in the load operation when the HV traveling is performed (continues) by the conditions of (1) to (7) and (11) to (13) not being satisfied and the engine 22 is in the autonomous operation when the HV traveling is performed by the conditions of (8) to (10) not being satisfied with the conditions of (1) to (7) and (11) to (13) being satisfied. (1) A condition that the required torque Tr* falls short of a threshold Trref. (2) A condition that the required power Pe* falls short of a threshold Peref. (3) A condition that the electric power storage ratio SOC of the battery 50 is equal to or higher than a threshold Sref (no forced charging for a recovery of the electric power storage ratio SOC has to be performed). (4) A condition that charging for an inspection of the battery 50 does not have to be performed. (5) A condition that the battery voltage Vb of the battery 50 is equal to or higher than a threshold Vbref (no forced charging for a recovery of the battery voltage Vb has to be performed). (6) A condition that the battery temperature Tb of the battery 50 is equal to or higher than a threshold Tbref (no forced charging and discharging for a rise in the battery temperature Tb has to be performed). (7) A condition that the output limit Wout of the battery 50 is equal to or higher than a threshold 'ref' (an output of the battery 50 can be ensured to some extent). (8) A condition that a cooling water temperature Tw of the engine 22 is equal to or higher than a threshold Twref (the engine 22 requires no warm-up) and a catalyst temperature Tc of a catalyst of a purification device attached to an exhaust pipe from the engine 22 is equal to or higher than a threshold Tcref (no catalyst warm-up is required). (9) A condition that an operation request for the engine 22 for ensuring a performance of a defroster which removes fogging of a window by using the engine 22 as a heat source has not been performed. (10) A condition that an operation request for the engine 22 for ensuring a performance (heating performance) of an air-conditioning device which uses the engine 22 as a heat source has not been performed. (11) A condition that an operation request for the engine 22 for diagnosing an abnormality of each component such as the engine 22 has not been performed. (12) A condition that an operation request for the engine 22 for fuel economy of the vehicle has not been performed. (13) A condition that no forced charging for a recovery of an electric power storage ratio of an auxiliary battery (not illustrated) which is connected to the electric power line 54 via the DC/DC converter has to be performed.

At a time of the EV traveling in the CD mode or the CS mode, the HVECU 70 sets the required torque Tr* first. Then, the HVECU 70 sets value 0 as the torque command Tm1* of the motor MG1 and sets the torque command Tm2* of the motor MG2 such that the required torque Tr* is output to the drive shaft 36 within the range of the input and output limits Win, Wout of the battery 50. Then, the HVECU 70 transmits the torque commands Tm1*, Tm2* of the motors MG1, MG2 to the motor ECU 40. After receiving the torque commands Tm1*, Tm2* of the motors MG1, MG2, the motor ECU 40 performs the switching control on the switching elements of the inverters 41, 42 such that the motors MG1, MG2 are driven in compliance with the torque commands Tm1*, Tm2*. At this time, the HVECU 70 also calculates the required power Pe* and the like as at the time of the HV traveling.

When a start condition of the engine 22 is satisfied during the EV traveling in the CD mode or the CS mode, the engine 22 is started and the hybrid car 20 is subjected to a transition to the HV traveling. In the first example, it is determined that the start condition of the engine 22 is satisfied when at least one of the stop conditions of the engine 22 (conditions of (1) to (13)) is not satisfied. The stop and start conditions of the engine 22 are not limited to the conditions of (1) to (13).

In the first example, the EV traveling is given more priority over the HV traveling at a time of the CD mode than at a time of the CS mode by, for example, the threshold Trref and the threshold Peref becoming sufficiently higher (by, for example, tens of kilowatts) at the time of the CD mode than at the time of the CS mode.

In addition, in the hybrid car 20 according to the first example, the HVECU 70 controls the charger 60 for the battery 50 to be charged with the electric power from the external electric power source when the electric power source plug 61 is connected to the external electric power source while the system is OFF at one's home or a charging point set in advance. Then, when the system has started, the hybrid car 20 according to the first example travels in the CD mode until the electric power storage ratio SOC of the battery 50 becomes equal to or lower than a threshold Shv2 (such as 25%, 30%, and 35%) when the electric power storage ratio SOC of the battery 50 is equal to or higher than a threshold Shv1 (such as 45%, 50%, and 55%) and travels in the CS mode once the electric power storage ratio SOC of the battery 50 becomes equal to or lower than the threshold Shv2. The hybrid car 20 according to the first example travels in the CS mode when the system has started with the electric power storage ratio SOC of the battery 50 falling short of the threshold Shv1.

Figure 2:
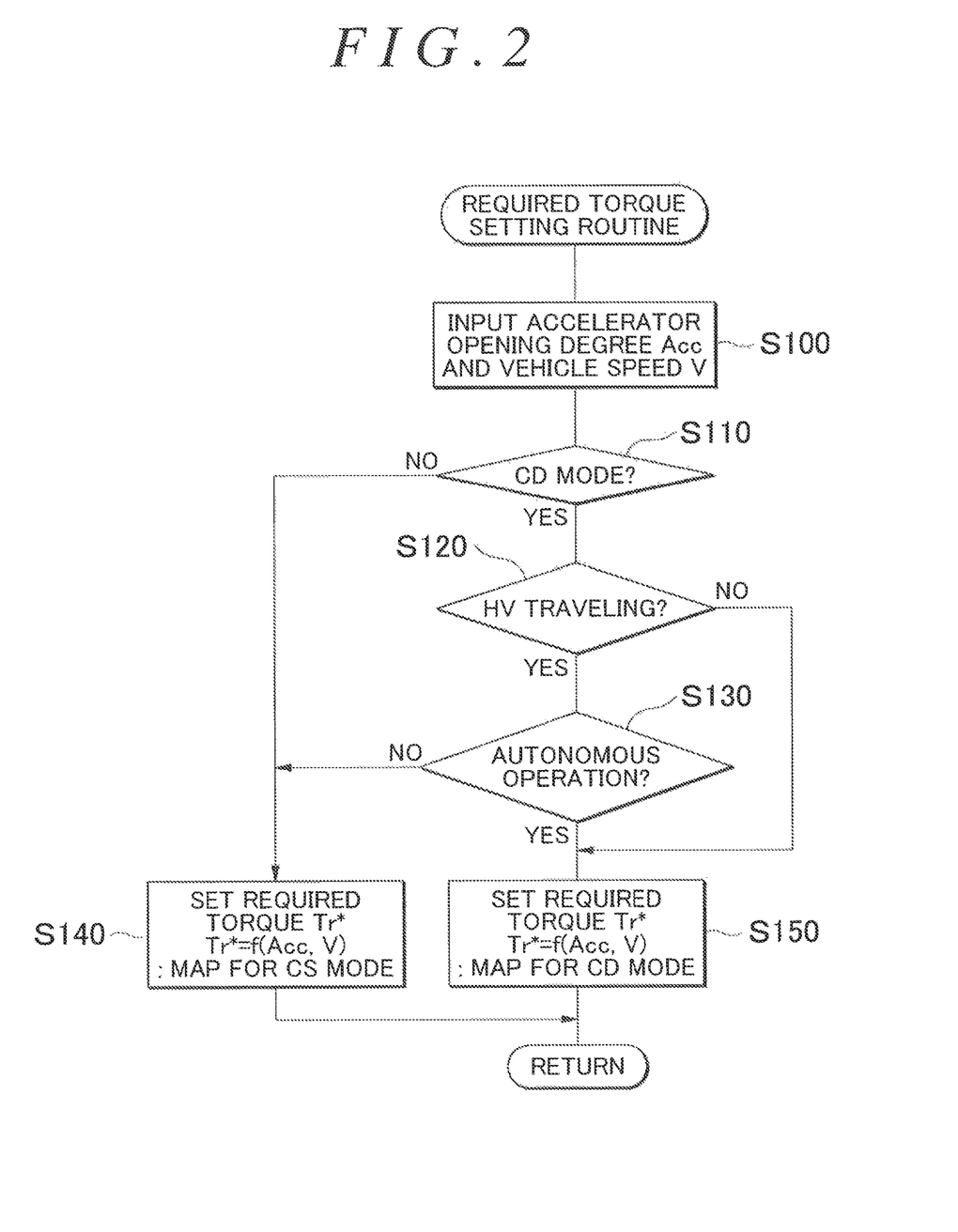
FIG. 2 is a flowchart illustrating an example of a required torque setting routine that is executed by a HVECU 70 of the first example.

Hereinafter, an operation of the hybrid car 20 according to the first example that is configured as described above, an operation during the setting of the required torque Tr* in particular, will be described. FIG. 2 is a flowchart illustrating an example of a required torque setting routine that is executed by the HVECU 70 of the first example. This routine is repeatedly executed at predetermined time intervals such as several msec).

Once the required torque setting routine is executed, the HVECU 70 first inputs data such as the accelerator opening degree Acc and the vehicle speed V (Step S100). Herein, a value that is detected by the accelerator pedal position sensor 84 is input as the accelerator opening degree Acc. A value that is detected by the vehicle speed sensor 88 is input as the vehicle speed V.

Figure 3:
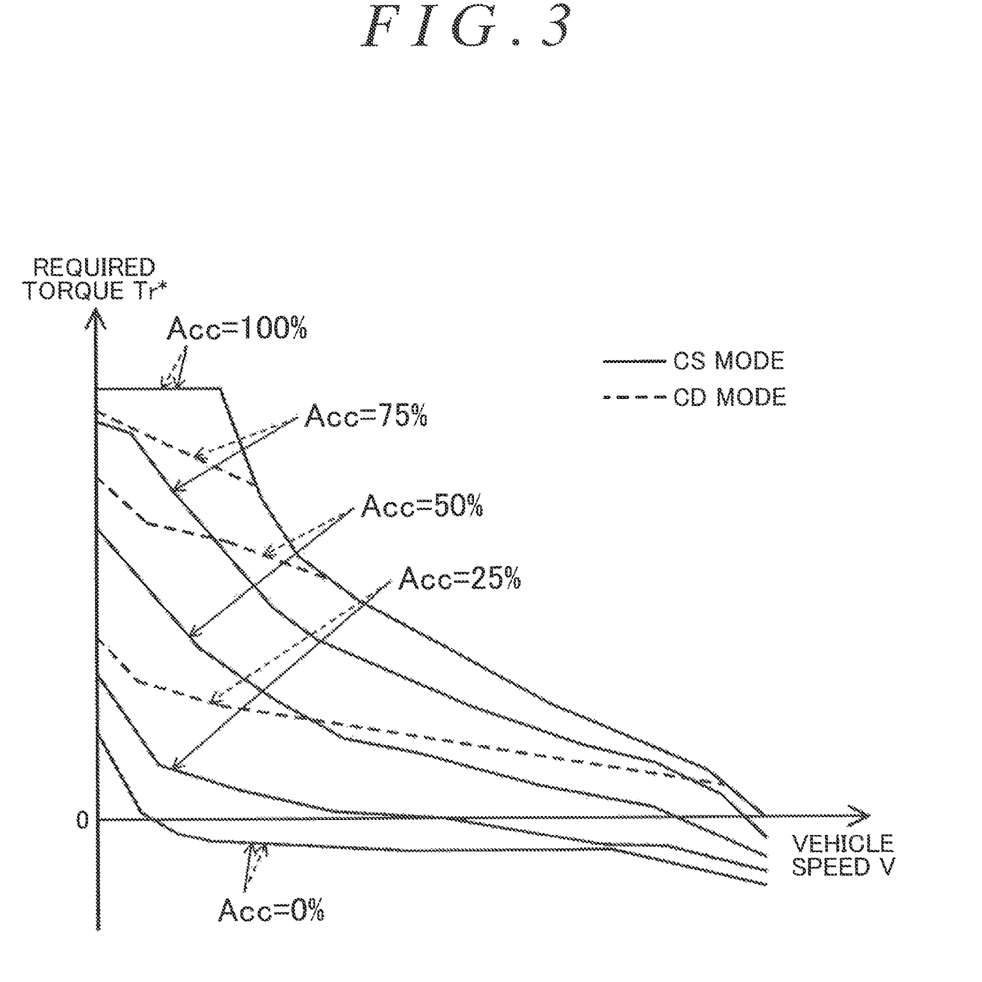
FIG. 3 is an explanatory diagram illustrating an example of a map for a CS mode and an example of a map for a CD mode.

After the data input, the HVECU 70 determines whether the traveling mode is the CD mode or the CS mode (Step S110). When the HVECU 70 determines that the traveling mode is the CS mode, the HVECU 70 sets the required torque Tr* based on a map for the CS mode, the accelerator opening degree Acc, and the vehicle speed V (Step S140) and terminates this routine. The map for the CS mode and a map for the CD mode (described later) are maps showing a relationship among the accelerator opening degree Acc, the vehicle speed V, and the required torque Tr*. An example of these maps is illustrated in FIG. 3. The solid lines in the drawing represent an example of the relationship among the accelerator opening degree Acc, the vehicle speed V, and the required torque Tr* in the map for the CS mode while the dashed lines in the drawing represent an example of the relationship among the accelerator opening degree Acc, the vehicle speed V, and the required torque Tr* in the map for the CD mode. As illustrated in FIG. 3, the map for the CD mode and the map for the CS mode are set such that the required torque Tr* in the map for the CD mode is higher than the required torque Tr* in the map for the CS mode with respect to the same accelerator opening degree Acc and the same vehicle speed V. This is based on that the CD mode is a traveling mode in which the EV traveling is given more priority over the HV traveling than in the CS mode and that a driver is less likely to feel a sense of acceleration at a time of acceleration during the EV traveling because the rotation speed Ne of the engine 22 does not rise at the time of the acceleration during the EV traveling.

When the HVECU 70 determines in Step S110 that the traveling mode is the CD mode, the HVECU 70 determines whether the EV traveling is in progress or the HV traveling is in progress (Step S120). Once the HVECU 70 determines that the EV traveling is in progress, this routine is terminated after the HVECU 70 sets the required torque Tr* based on the map for the CD mode, the accelerator opening degree Acc, and the vehicle speed V (Step S150). In this manner, the sense of acceleration at the time of the acceleration can be enhanced.

When the HVECU 70 determines in Step S120 that the HV traveling is in progress, the HVECU 70 determines whether the engine 22 is in the load operation or is in the autonomous operation (no-load operation) (Step S130). When it is determined that the engine 22 is in the load operation, the HVECU 70 terminates this routine after setting the required torque Tr* based on the map for the CS mode, the accelerator opening degree Acc, and the vehicle speed V (Step S140).

Herein, the occasion of a predetermined transition is conceivable as a transition from a state of the HV traveling entailing the load operation of the engine 22 in the CS mode to a state of the HV traveling entailing the load operation of the engine 22 in the CD mode. This predetermined transition is performed when a transition to the CD mode is requested with the mode switch 89 operated in the state of the HV traveling entailing the load operation of the engine 22 in the CS mode. As described above, in the first example, the HVECU 70 sets the required torque Tr* by using the map for the CS mode, as at a time of the CS mode (at a time of the HV traveling entailing the load operation of the engine 22 in the CS mode), at a time of the HV traveling entailing the load operation of the engine 22 in the CD mode. This allows a rise in the required torque Tr* in the event of the predetermined transition to be suppressed compared to the setting of the required torque Tr* that uses the map for the CD mode. Accordingly, a rise in the required power Pe* and a rise in the target rotation speed Ne* of the engine 22 during the predetermined transition can be suppressed. As a result, a rise in an output of the engine 22 (rotation speed Ne, torque Te) can be suppressed, and a sense of high-rpm idling of the engine 22 can be inhibited from being felt by the driven. At this time, the rise in the required power Pe* and the rise in the target rotation speed Ne* of the engine 22 during the predetermined transition can be further suppressed, compared to the setting of a value between a value obtained by the use of the map for the CD mode and a value obtained by the use of the map for the CS mode as the required torque Tr*, by the required torque Tr* being set by the use of the map for the CS mode.

In addition, an occasion when the HV traveling entailing the load operation of the engine 22 in the CD mode continues is conceivable. As described above, in the first example, the required torque Tr* is set by the map for the CS mode being used. This allows the required torque Tr* to be reduced compared to the setting of the required torque Tr* using the map for the CD mode. Accordingly, the required power Pe* and the target rotation speed Ne* of the engine 22 can be reduced. As a result, the output of the engine 22 (rotation speed Ne, torque Te) can be reduced, and the sense of the high-rpm idling of the engine 22 can be inhibited from being felt by the driver.

When the HVECU 70 determines in Step S130 that the engine 22 is in the autonomous operation (no-load operation), the HVECU 70 terminates this routine after setting the required torque Tr* based on the map for the CD mode, the accelerator opening degree Acc, and the vehicle speed V (Step S150). Then, the sense of acceleration during the acceleration can be enhanced. When the HV traveling entailing the autonomous operation of the engine 22 in the CD mode is performed, the possibility of the driver feeling the sense of the high-rpm idling of the engine 22 is sufficiently lower than when the HV traveling is performed with the load operation of the engine 22 entailed in the CD mode.

At the time of the HV traveling of the hybrid car 20 according to the first example described above that entails the load operation of the engine 22 in the CD mode, the HVECU 70 sets the required torque Tr* by using the map bar the CS mode in which the required torque Tr* is set to be lower than in the map for the CD mode as at a time of the CS mode (at the time of the HV traveling entailing the load operation of the engine 22 in the CS mode). Accordingly, a rise in the required torque Tr* at the time of the predetermined transition, which is the transition from the state of the HV traveling entailing the load operation of the engine 22 in the CS mode to the state of the HV traveling entailing the load operation of the engine 22 in the CD mode, can be suppressed compared to the setting of the required torque Tr* using the map for the CD mode. As a result, the rise in the required power Pe* and the rise in the target rotation speed Ne* of the engine 22 at the time of the predetermined transition can be suppressed, and the sense of the high-rpm idling of the engine 22 can be inhibited from being felt by the driver.

When the HV traveling of the hybrid car 20 according to the first example that entails the load operation of the engine 22 in the CD mode is performed, the required torque Tr* is set by the use of the map for the CS mode. Accordingly, the required torque Tr* can be reduced compared to the setting of the required torque Tr* using the map for the CD mode. As a result, the required power Pe* and the target rotation speed Ne* of the engine 22 at a time when the HV traveling entailing the load operation of the engine 22 in the CD mode continues can be reduced, and the sense of the high-rpm idling of the engine 22 can be inhibited from being felt by the driver.

Figure 5A:
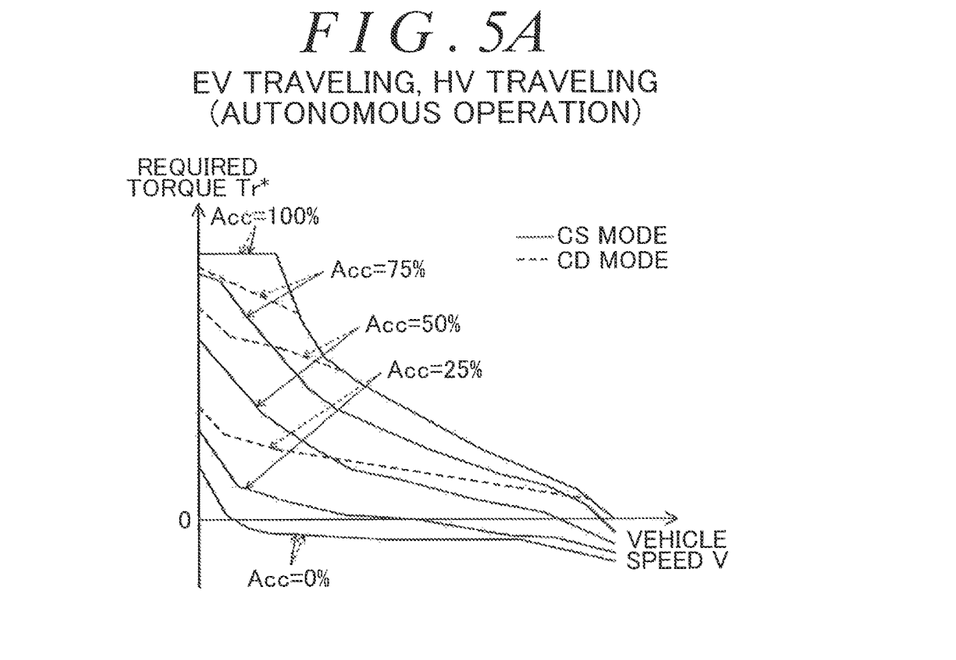
FIGS. 5A, 5B are explanatory diagrams illustrating an example of the map for the CS mode and an example of the map for the CD mode according to a modification example.
Figure 5B:
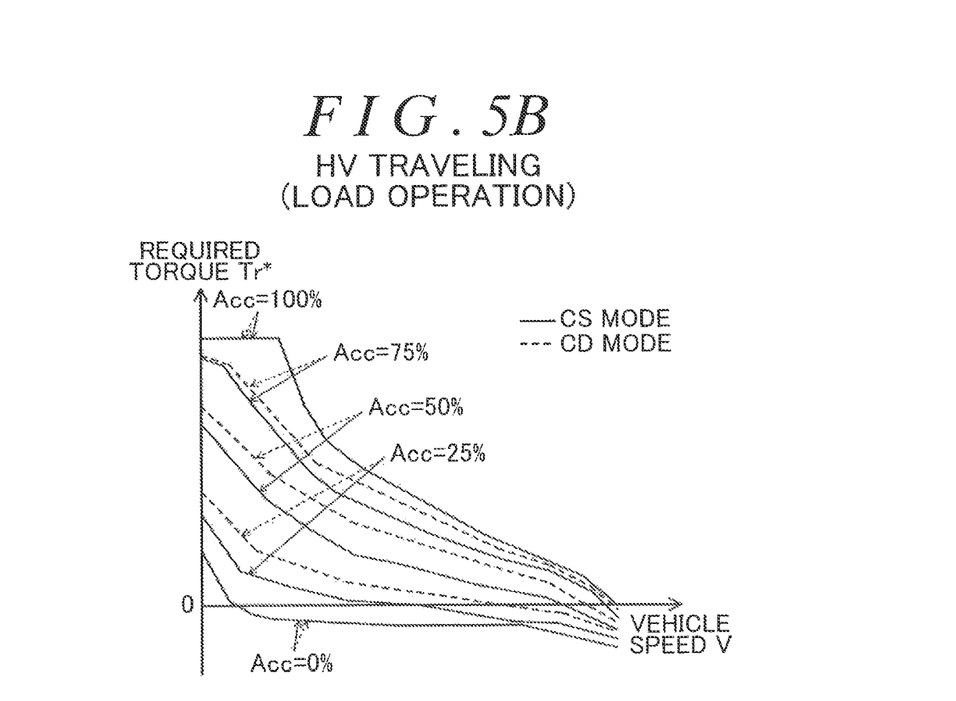

In the hybrid car 20 according to the first example, the required torque Tr* is set by the use of the map for the CS mode at the time of the HV traveling entailing the load operation of the engine 22 in the CD mode. At this time, however, a value exceeding the value obtained by the use of the map for the CS mode and falling short of the value obtained by the use of the map for the CD mode may also be set as the required torque Tr*. In addition, as illustrated in the map for the CD mode (and the map for the CS mode) according to a modification example that is illustrated in FIGS. 5A, 5B, the HVECU 70 may set, at a time of the CD mode, the required torque Tr* by using two different maps for the CD mode associated with a time of the EV traveling or the HV traveling entailing the autonomous operation of the engine 22 and a time of the HV traveling entailing the load operation of the engine 22, respectively. FIG. 5A shows the map for the CD mode (and the map for the CS mode) at the time of the EV traveling or the HV traveling entailing the autonomous operation of the engine 22 in the CD mode, and FIG. 5B shows the map for the CD mode (and the map for the CS mode) at the time of the HV traveling entailing the load operation of the engine 22 in the CD mode. The maps for the CS mode illustrated in FIGS. 5A and 5B are the same as the map for the CS mode illustrated in FIG. 3, and the map for the CD mode illustrated in FIG. 5A is the same as the map for the CD mode illustrated in FIG. 3. The map for the CD mode illustrated in FIG. 5B is set such that a difference from the value obtained by the use of the map for the CS mode is smaller within a positive range than in the map for the CD mode illustrated in FIG. 5A with respect to the accelerator opening degree Acc (smaller than the value obtained by the use of the map for the CD mode in FIG. 5A and greater than the value obtained by the use of the map for the CS mode in FIGS. 5A and 5B). Even in these cases, the rise in the required torque Tr* during the predetermined transition can be suppressed compared to the setting of the required torque Tr* using the map for the CD mode at the time of the HV traveling entailing the load operation of the engine 22 in the CD mode.

In the hybrid car 20 according to the first example, the required torque Tr* is set by the use of the map for the CD mode at a time of the HV traveling entailing the autonomous operation of the engine 22 in the CD mode. At this time, however, a value that falls short of the value obtained by the use of the map for the CD mode and is equal to or greater than a value at the time of the HV traveling entailing the load operation of the engine 22 in the CD mode may also be set as the required torque Tr*.

In the hybrid car 20 according to the first example, the required torque Tr* is set by the map for the CS mode being used at a time of the CS mode or at a time of the HV traveling entailing the load operation of the engine 22 in the CD mode and the required torque Tr* is set by the map for the CD mode being used at a time of the EV traveling or the HV traveling entailing the autonomous operation of the engine 22 in the CD mode. However, the required output may be set to be equal to or higher than that in the CS mode with respect to the same accelerator opening degree Acc at a time of the CD mode and such that a difference between that at a time of the CD mode and that at a time of the CS mode is smaller at the time of the HV traveling than at the time of the EV traveling. For example, the HVECU 70 may set the required torque Tr* by using the map for the CS mode during the EV traveling in the CS mode and may set the required torque Tr* by using the map for the CD mode in the event of the HV traveling in the CS mode or in the event of the CD mode. In addition, the HVECU 70 may set the required torque Tr* by using the map for the CD mode in the event of the CD mode, may set the required torque Tr* by using the map for the CS mode in the event of the EV traveling in the CS mode, and may set, as the required torque Tr*, the value exceeding the value obtained by the use of the map for the CS mode and falling short of the value obtained by the use of the map for the CD mode in the event of the HV traveling in the CS mode. Furthermore, the HVECU 70 may set the required torque Tr* by using the map for the CS mode in the event of the EV traveling in the CS mode, may set the required torque Tr* by using the map for the CD mode in the event of the EV traveling in the CD mode, and may set, as the required torque Tr*, the value exceeding the value obtained by the use of the map for the CS mode and falling short of the value obtained by the use of the map for the CD mode in the event of the HV traveling in the CS mode or the CD mode.

Hereinafter, a hybrid car 20B according to a second example of the present disclosure will be described. The hybrid car 20B according to the second example has the same hardware configuration as the hybrid car 20 according to the first example that has been described with reference to FIG. 1, and the control that is performed on the hybrid car 20B according to the second example is identical to the control performed on the hybrid car 20 according to the first example except for methods for setting the traveling mode and the required torque Tr*. Accordingly, descriptions regarding the hardware configuration of the hybrid car 20B according to the second example and the like will be omitted so that repetitive descriptions can be avoided.

In the hybrid car 20B according to the second example, a HVECU 70B sets the required torque Tr* by using the map for the CS mode at a time of the CS mode and sets the required torque Tr* by using the map for the CD mode, in which the required torque Tr* is set to be higher than at the time of the CS mode, at a time of the CD mode.

Figure 4:
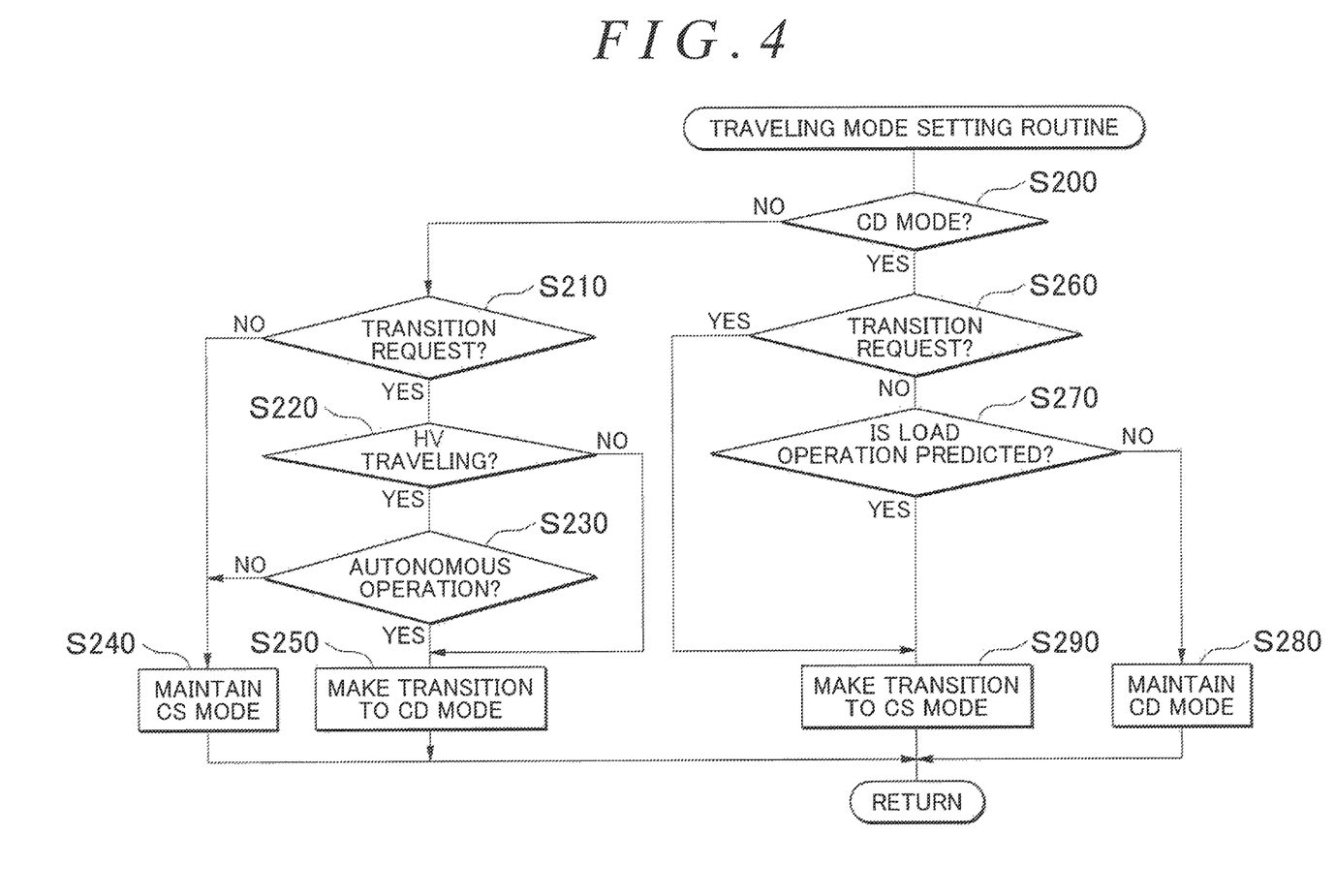
FIG. 4 is a flowchart illustrating an example of a traveling mode setting routine that is executed by a HVECU 70B of a second example.

In addition, in the hybrid car 20B according to the second example, the HVECU 70B sets the traveling mode based on a traveling mode setting routine illustrated in FIG. 4. This routine is repeatedly executed at predetermined time intervals (such as several msec).

Once the traveling mode setting routine is executed, the HVECU 70B first determines whether the current traveling mode is the CD mode or the CS mode (Step S200). Basically, in the second example, the traveling mode (CD mode or CS mode) is set in accordance with the electric power storage ratio SOC of the battery 50 at the time of the start of the system and the subsequent electric power storage ratio SOC of the battery 50 as in the first example.

Once the HVECU 70B determines in Step S200 that the current traveling mode is the CS mode, the HVECU 70B determines whether or not the transition to the CD mode has been requested (Step S210). A time when the mode switch 89 has been operated is regarded as the time when the transition to the CD mode has been requested. Once the HVECU 70B determines that the transition to the CD mode has not been requested, the HVECU 70B terminates this routine after maintaining the traveling mode in the CS mode (Step S240).

Once the HVECU 70B determines in Step S210 that the transition to the CD mode has been requested, the HVECU 70B determines whether the EV traveling is in progress or the HV traveling is in progress (Step S220). When the HVECU 70B determines the EV traveling is in progress, the HVECU 70B performs the traveling mode transition from the CS mode to the CD mode (Step S250), and then terminates this routine. In this manner, the request fix the transition from the CS mode to the CD mode can be responded to.

Once the HVECU 70B determines in Step S220 that the HV traveling is in progress, the HVECU 70B determines whether the engine 22 is in the autonomous operation (no-load operation) or is in the load operation (Step S230). When the HVECU 70B determines that the engine 22 is in the autonomous operation, the HVECU 70B terminates this routine after the traveling mode transition from the CS mode to the CD mode (Step S250). In this manner, the request for the transition from the CS mode to the CD mode can be responded to.

When the HVECU 70B determines in Step S230 that the engine 22 is in the load operation, the HVECU 70B terminates this routine after maintaining the traveling mode in the CS mode (Step S240). As described above, in the second example, the required torque Tr* is set by the use of the map for the CS mode at a time of the CS mode and the required torque Tr* is set by the use of the map for the CD mode, in which the required torque Tr* is set to be higher than at the time of the CS mode, at a time of the CD mode. Accordingly, a transition from the state of the traveling entailing the load operation of the engine 22 in the CS mode to the state of the HV traveling entailing the load operation of the engine 22 in the CD in response to the request for the transition to the CD mode results in a rise in the required torque Tr*, which, in turn, leads to a rise in the required power Pe* and a rise in the target rotation speed Ne* of the engine 22. This also causes the output of the engine 22 (rotation speed Ne, torque Te) to rise, resulting in the possibility of the driver feeling the sense of the high-rpm idling of the engine 22. In contrast, in the second example, the CS mode is maintained, that is, no transition is made to the CD mode, even in the event of the request for the transition to the CD mode, during the HV traveling entailing the load operation of the engine 22 in the CS mode, and thus the driver's feeling the sense of the high-rpm idling of the engine 22 can be suppressed (avoided). In the event of the EV traveling or the HV traveling entailing the autonomous operation of the engine in the CS mode, the possibility of the sense of the high-rpm of the engine being felt at a time of the transition to the CD mode is sufficiently lower than in the event of the HV traveling entailing the load operation of the engine in the CS mode. Accordingly, in the second example, the transition to the CD mode is made when the transition to the CD mode has been requested during the EV traveling or the HV traveling entailing the autonomous operation of the engine in the CS mode as described above.

Once the HVECU 70B determines in Step S200 that the current traveling mode is the CD mode, the HVECU 70B determines whether or not a transition to the CS mode has been requested (Step S260). A time when the electric power storage ratio SOC of the battery 50 has become equal to or lower than the threshold Shv2 and a time when the mode switch 89 has been operated are regarded as the time when the transition to the CS mode has been requested.

Once the HVECU 70B determines in Step S260 that the transition to the CS mode has not been requested, the HVECU 70B determines whether or not an initiation of the load operation of the engine 22 is predicted (Step S270). In the second example, the EV traveling or the HV traveling entailing the autonomous operation of the engine 22 is performed at a time of the CD mode. In other words, the HV traveling entailing the load operation of the engine 22 in the CD mode is not performed. A reason for this will be described later. In addition, whether or not the initiation of the load operation of the engine 22 is predicted can be determined by the use of, for example, the amounts of increase (rates of increase) in the required torque Tr* and the required power Pe* per unit time.

Once the HVECU 70B determines in Step S270 that the initiation of the load operation of the engine 22 is not predicted, the HVECU 70B terminates this routine after maintaining the traveling mode in the CD mode (Step S280). Once the HVECU 70B determines that the initiation of the load operation of the engine 22 is predicted, the HVECU 70B performs the traveling mode transition from the CD mode to the CS mode (Step S290), and then terminates this routine. At a time of the CD mode, the required torque Tr* is set by the use of the map for the CD mode, and thus the required torque Tr* is likely to become relatively high. Accordingly, when the HV traveling entailing the load operation of the engine 22 in the CD mode is performed, the required power Pe* and the target rotation speed Ne* of the engine 22 become relatively high, the output of the engine 22 (rotation speed Ne, torque Te) becomes relatively high, and the driver might feel the sense of the high-rpm idling of the engine 22. In contrast, in the second example, the traveling mode transition to the CS mode is performed when the initiation of the load operation of the engine 22 is predicted during the EV traveling or the HV traveling entailing the autonomous operation of the engine 22 in the CD mode, and thus the driver's feeling the sense of the high-rpm idling of the engine 22 can be suppressed (avoided).

Once the HVECU 70B determines in Step S260 that the transition to the CS mode has been requested, the HVECU 70B terminates this routine after the traveling mode transition from the CD mode to the CS mode (Step S290). In this manner, the request for the transition from the CD mode to the CS mode can be responded to.

In the hybrid car 20B according to the second example described above, the required torque Tr* is set by the use of the map for the CS mode at a time of the CS mode and the required torque Tr* is set by the use of the map for the CD mode, in which the required torque Tr* is set to be higher than in the map for the CS mode, at a time of the CD mode. In addition, in the hybrid car 20B according to the second example, the CS mode is maintained, that is, no transition is made to the CD mode, even in the event of the request for the transition to the CD mode, during the HV traveling entailing the load operation of the engine 22 in the CS mode. Accordingly, a rise in the required torque Tr* can be suppressed compared to the traveling mode transition to the CD mode being performed. As a result, the rise in the required power Pe* and the rise in the target rotation speed Ne* of the engine 22 can be suppressed compared to this transition being performed, and the sense of the high-rpm idling of the engine 22 can be inhibited from being felt by the driver.

In the hybrid car 20B according to the second example, the traveling mode transition to the CS mode is performed when the initiation of the load operation of the engine 22 is predicted during the EV traveling or the HV traveling entailing the autonomous operation of the engine 22 in the CD mode. Accordingly, the required torque Tr* can be reduced compared to the CD mode being maintained (the HV traveling entailing the load operation of the engine 22 in the CD mode is performed). As a result, the required power Pe* and the target rotation speed Ne* of the engine 22 can be reduced compared to the CD mode being maintained, and the driver's feeling the sense of the high-rpm idling of the engine 22 can be suppressed.

In the hybrid car 20B according to the second example, the transition to the CD mode is performed when the transition to the CD mode has been requested during the HV traveling entailing the autonomous operation of the engine 22 in the CS mode and the CS mode is maintained when the transition to the CD mode has been requested during the HV traveling entailing the load operation of the engine 22 in the CS mode. When the transition to the CD mode has been requested during the HV traveling in the CS mode, however, the CS mode may be maintained regardless of whether the engine 22 is in the autonomous operation or is in the load operation.

In the hybrid car 20B according to the second example, the traveling mode transition to the CS mode is performed when the initiation of the load operation of the engine 22 is predicted during the EV traveling or the HV traveling entailing the autonomous operation of the engine 22 in the CD mode. However, the CD mode may be maintained instead.

Figure 6:
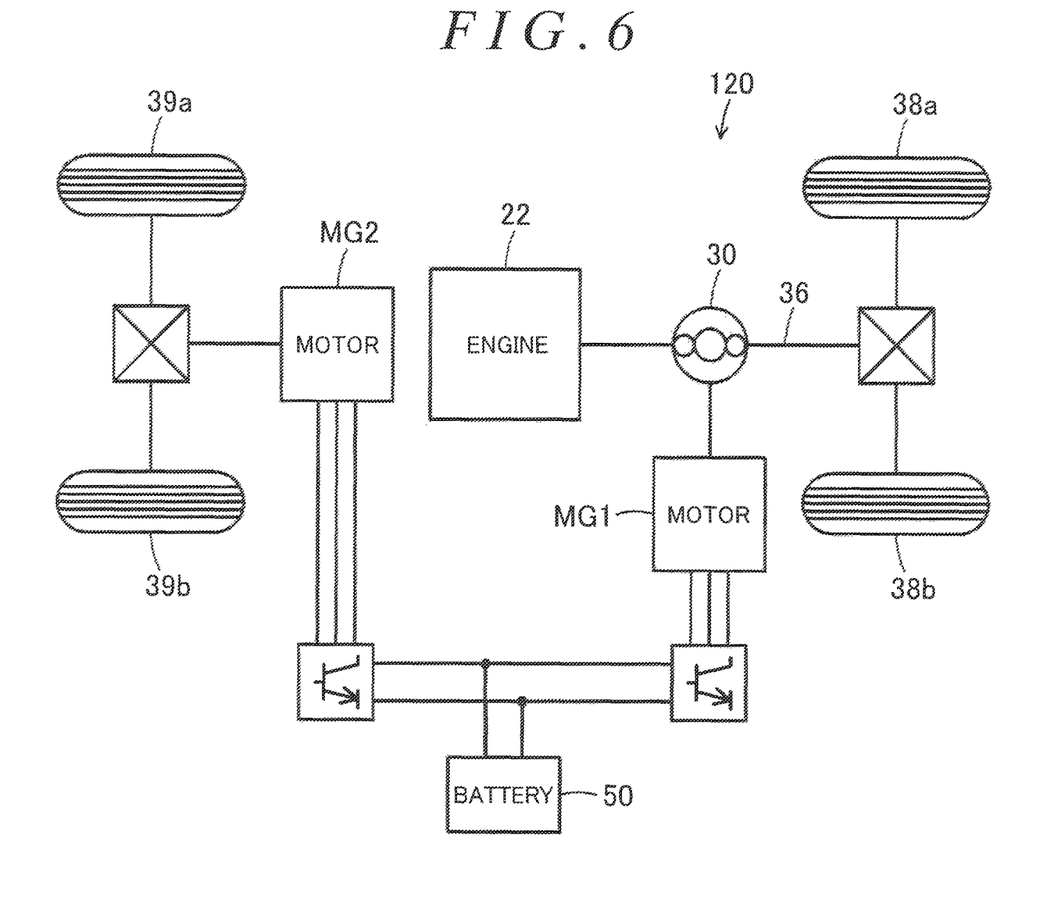
FIG. 6 is a configuration diagram schematically illustrating a configuration of a hybrid car 120 according to a modification example.

In the hybrid cars 20, 20B according to the first and second examples, the power from the motor MG2 is output to the drive shaft 36 connected to the drive wheels 38a, 38b. However, as shown in the form of a hybrid car 120 according to a modification example that is illustrated in FIG. 6, the power from the motor MG2 may also be output to an axle (axle connected to vehicle wheels 39a, 39b illustrated in FIG. 6) other than the axle to which the drive shaft 36 is connected (axle connected to the drive wheels 38a, 38b).

Figure 7:
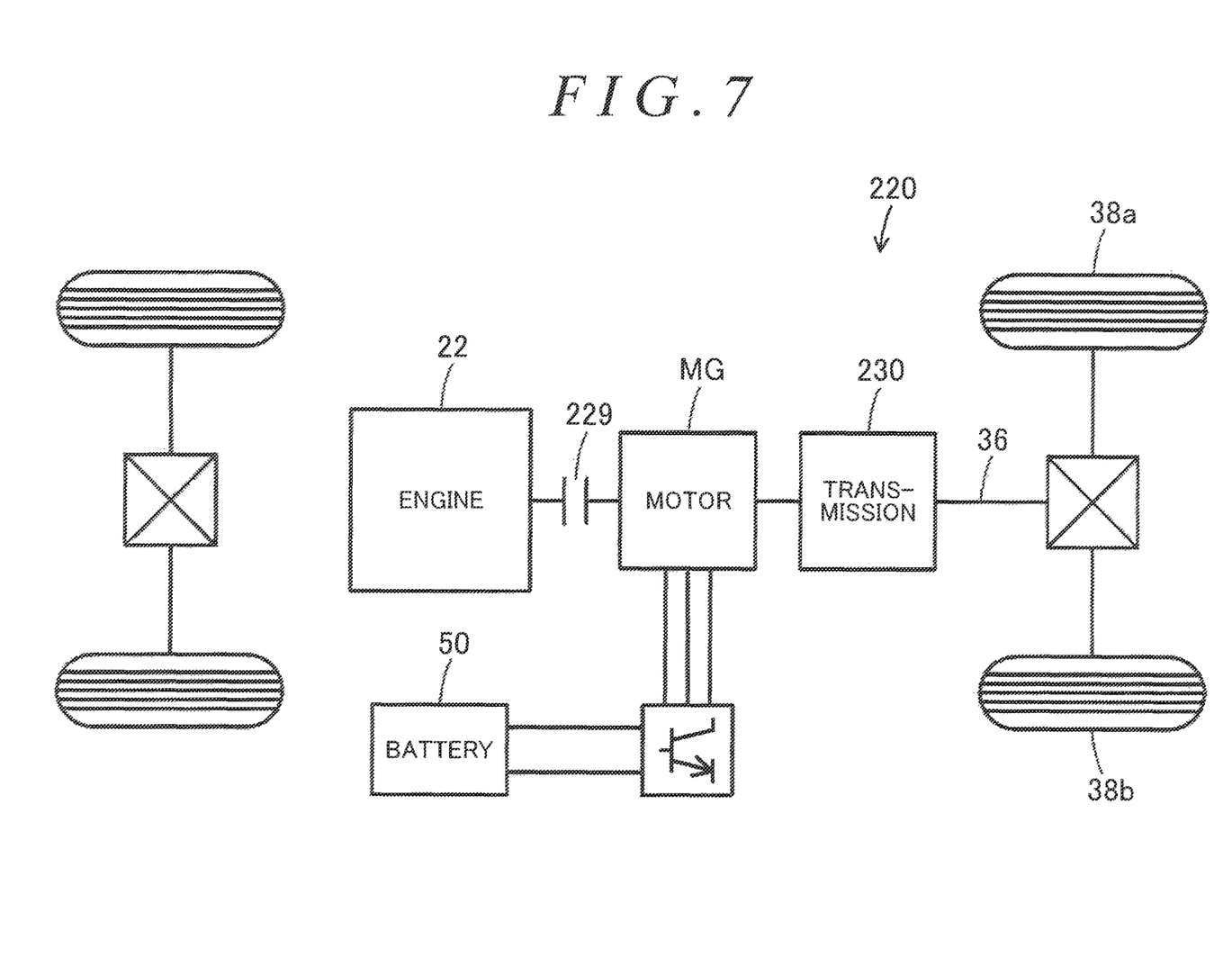
FIG. 7 is a configuration diagram schematically illustrating a configuration of a hybrid car 220 according to a modification example.

In the hybrid cars 20, 20B according to the first and second examples, the power from the engine 22 is output to the drive shaft 36 connected to the drive wheels 38a, 38b via the planetary gear 30 and the power from the motor MG2 is output to the drive shaft 36. However, as shown in the form of a hybrid car 220 according to a modification example that is illustrated in FIG. 7, the power from the engine 22 may be output to the drive shaft 36 via a rotary shaft of a motor MG and a transmission 230 and power from the motor MG may be output to the drive shaft via the transmission 230 in an alternative configuration in which the motor MG is connected via the transmission 230 to the drive shaft 36 connected to the drive wheels 38a, 38b and the engine 22 is connected to the rotary shaft of the motor MG via a clutch 229.

A correspondence relationship between main elements of the examples and main elements of the present disclosure described in Summary will be described. In the examples, the engine 22 corresponds to the "engine", the motor MG2 corresponds to the "motor", the battery 50 corresponds to the "battery", and the HVECU 70, the engine ECU 24, and the motor ECU 40 correspond to the "electronic control unit".

The correspondence relationship between the main elements of the examples and the main elements of the present disclosure described in Summary does not limit the elements that are described in Summary because the examples are for exemplary purposes fix a detailed description of the embodiment that is described in Summary. In other words, interpretation of the present disclosure described in Summary should be grounded on the description in that column, and it should be noted that the examples are merely specific examples of the present disclosure described in Summary.

The embodiment of the present disclosure has been described by the use of the examples. The present disclosure, however, is not limited to these examples. It is a matter of course that the present disclosure can be realized in various forms without departing from the scope of the present disclosure.

The present disclosure can be used in, for example, the hybrid car manufacturing industry.

What is claimed is:

1. A hybrid car comprising:
an engine configured to output power for traveling;
a motor configured to output power for traveling;
a battery configured to exchange electric power with the motor, and
an electronic control unit configured to
i) control the engine and the motor for traveling in accordance with a required output for traveling with respect to an accelerator operation amount in a charge depleting mode or a charge sustaining mode,
ii) set the required output such that the required output at a time of the charge depleting mode exceeds the required output at a time of the charge sustaining mode with respect to a same accelerator operation amount at a time of electric traveling as traveling not entailing an operation of the engine, and
iii) set the required output such that the required output at the time of the charge depleting mode is equal to or higher than the required output at the time of the charge sustaining mode with respect to the same accelerator operation amount and a difference between the required output at the time of the charge depleting mode and the required output at the time of the charge sustaining mode with respect to the same accelerator operation amount is smaller than at the time of the electric traveling at a time of hybrid traveling as traveling entailing the operation of the engine.

2. The hybrid car according to claim 1, wherein
the electronic control unit is configured to set the required output such that the required output at the time of the hybrid traveling falls short of the required output at the time of the electric traveling with respect to the same accelerator operation amount at the time of the charge depleting mode.

3. The hybrid car according to claim 2, wherein
the electronic control unit is configured to set the required output such that the required output at a time of the hybrid traveling entailing an autonomous operation of the engine is equal to or lower than the required output at the time of the electric traveling and exceeds the required output at a time of the hybrid traveling entailing a load operation of the engine with respect to the same accelerator operation amount at the time of the charge depleting mode.

4. The hybrid car according to claim 1, wherein
the electronic control unit is configured to set the required output such that the required output at the time of the charge depleting mode and the required output at the time of the charge sustaining mode are equal to each other with respect to the same accelerator operation amount at the time of the hybrid traveling.

5. A hybrid car comprising:
an engine configured to output power for traveling;
a motor configured to output power for traveling;
a battery configured to exchange electric power with the motor, and
an electronic control unit configured to
i) control the engine and the motor for traveling in accordance with a required output for traveling with respect to an accelerator operation amount in a charge depleting mode or a charge sustaining mode,
ii) set the required output such that the required output at a time of the charge depleting mode exceeds the required output at a time of the charge sustaining mode with respect to a same accelerator operation amount, and
iii) maintain the charge sustaining mode at a time of hybrid traveling when a transition to the charge depleting mode has been requested during the charge sustaining mode,
wherein the electronic control unit is configured to make the transition to the charge sustaining mode when an initiation of the load operation of the engine is predicted during one of the electric traveling and the hybrid traveling entailing the autonomous operation of the engine in the charge depleting mode.

6. The hybrid car according to claim 5, wherein
the electronic control unit is configured to make the transition to the charge depleting mode during one of electric traveling and the hybrid traveling entailing the autonomous operation of the engine and maintain the charge sustaining mode during the hybrid traveling entailing load operation of the engine, when the transition to the charge depleting mode has been requested in the charge sustaining mode.

* * * * *